United States Patent [19]
Brown et al.

[11] 3,753,766
[45] Aug. 13, 1973

[54] METHOD FOR SEALING PIPELINES
[75] Inventors: George A. Brown, Casselberry, Fla.;
Francis Michael Hinds, Decatur, Ala.
[73] Assignee: Southern Line Cleaning, Inc., Casselberry, Fla.
[22] Filed: Jan. 6, 1971
[21] Appl. No.: 104,424

[52] U.S. Cl............. 117/97, 117/132, 117/161 ZB, 117/DIG. 3, 118/306, 118/318, 138/97, 260/37 EP
[51] Int. Cl................................ B44d 1/02
[58] Field of Search.................. 117/97, 132, 95, 117/96, 97, DIG. 3, 161 ZB; 260/37 EP; 138/97; 118/306, 317

[56] References Cited
UNITED STATES PATENTS

| | | | |
|---|---|---|---|
| 2,792,807 | 5/1957 | Cummings | 117/97 X |
| 3,168,909 | 2/1965 | Zurbrigen et al. | 138/97 |
| 2,998,800 | 9/1961 | Vernooy | 118/306 X |
| 2,935,777 | 5/1970 | Perkins et al. | 118/317 X |
| 3,034,729 | 5/1962 | Gray et al. | 118/306 X |
| 3,044,136 | 7/1962 | Perkins | 118/306 X |
| 3,108,012 | 10/1963 | Curtis | 117/97 X |

*Primary Examiner*—Edward G. Whitby
*Attorney*—Mason, Mason & Albright

[57] ABSTRACT

A slinger nozzle or head assembly is moved through a pipeline to coat the interior thereof. The nozzle is normally positioned adjacent joint seams or other leak sites and rotated to develop centrifugal action. A cureable sealing composition is fed into the nozzle to be thrown by centrifugal force outwardly through openings in the sides of the nozzle. The sealing composition can then be distributed about the leak site on the interior surface of the pipeline. The operative assembly includes a closed circuit TV camera in a protective casing (or other detector) to which can be attached the slinger head followed by a supply container having a load of sealing composition. The composition is cureable and can be of the epoxy type with varying proportions of fillers to control the viscosity and catalyst curing agent to regulate the curing time. An inhibitor and/or accelerator can be included to prolong or lessen the pot life of the composition, particularly at higher temperatures.

5 Claims, 5 Drawing Figures

PATENTED AUG 21 1973

INVENTORS
GEORGE A. BROWN
FRANCIS M. HINDS

BY *Mason, Mason & Albright*
ATTORNEYS

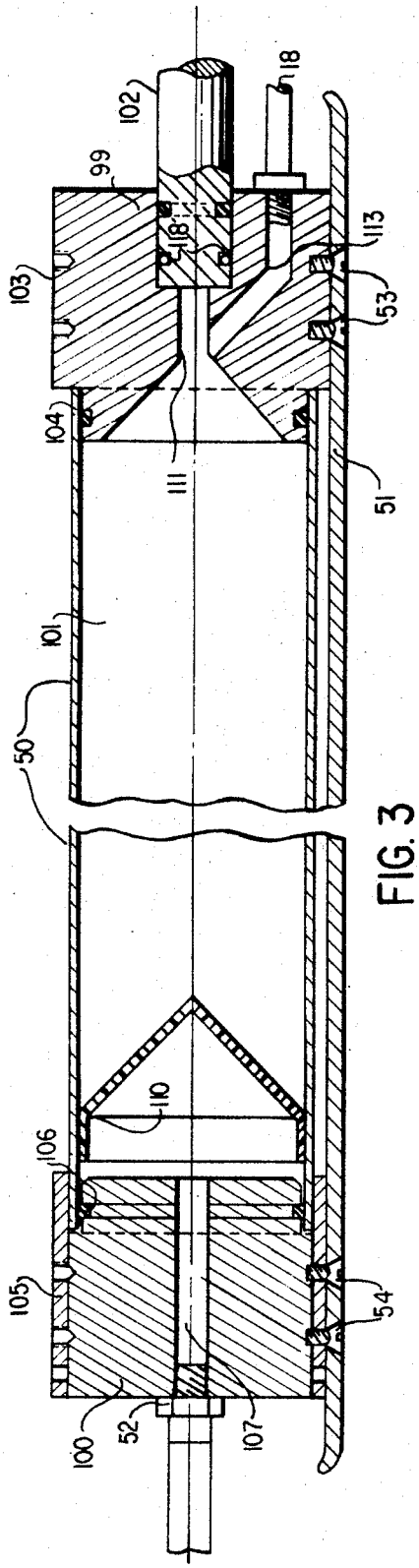
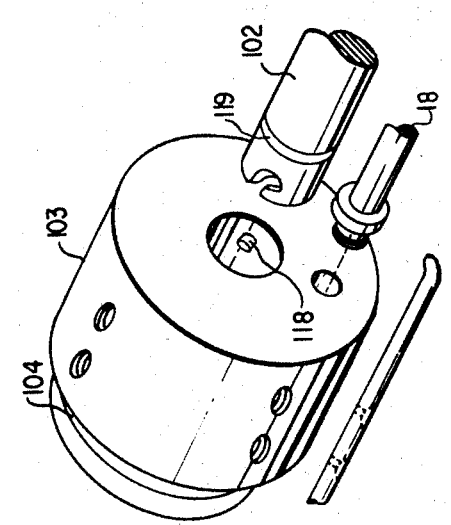
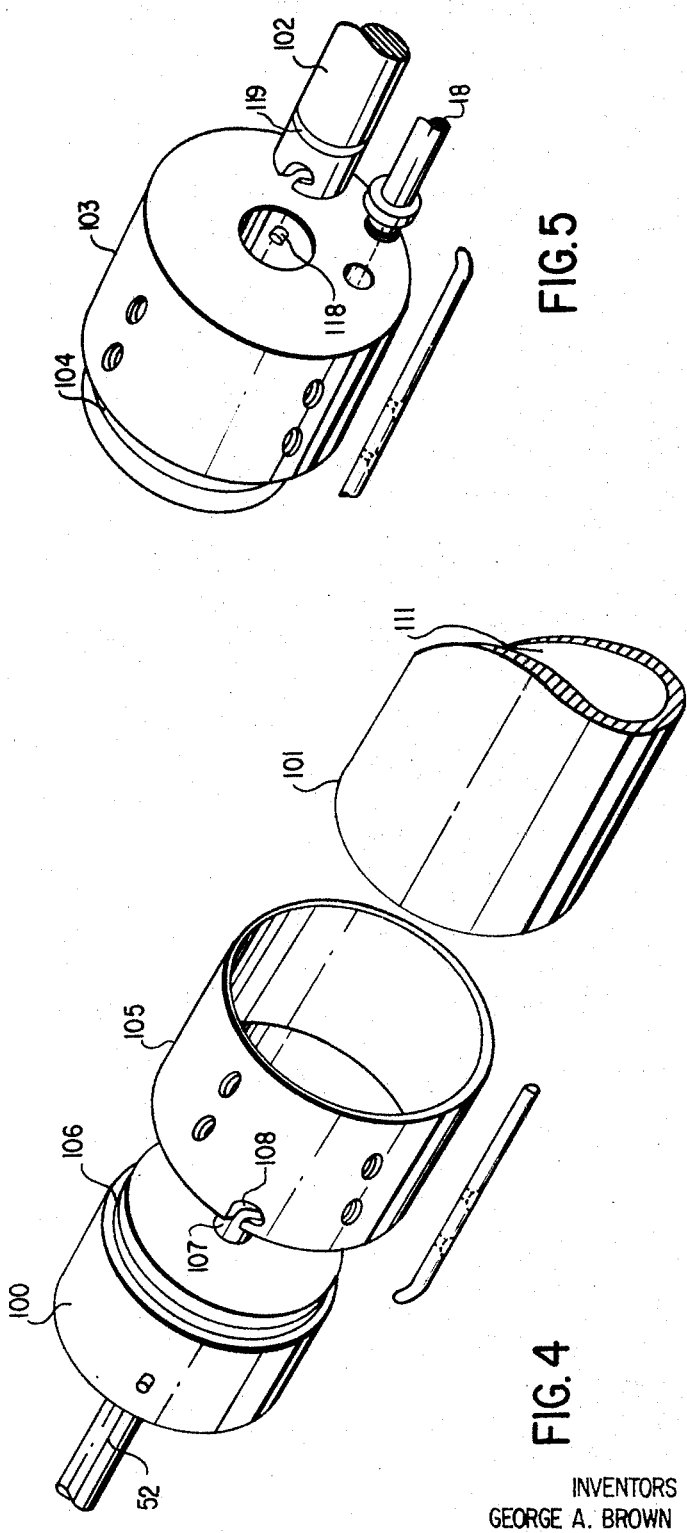
FIG. 3
FIG. 5
FIG. 4
INVENTORS
GEORGE A. BROWN
FRANCIS M. HINDS

METHOD FOR SEALING PIPELINES

This invention relates to a method and apparatus for repairing pipelines and in particular, underground horizontal pipes which are accessible between two spaced apart vertical excavations or openings. Methods and devices are known to repair underground pipelines in which electronic detectors are pulled or otherwise moved through a pipeline with sealing compositions being applied by various methods to the interior of the pipeline. For instance, the disclosures of U.S. Pat. Nos. 2,894,539; 2,971,259; 3,168,908 describe pipeline inspection and/or repair assemblies that can be drawn through an underground sewer or gas pipeline.

In copending application Ser. No. 82,453 filed Oct. 20, 1970, now U.S. Pat. No. 3,655,122 titled "Pipe Line Cleaner and Sealer" a rotatable nozzle device is disclosed through which grout or epoxy sealant is thrown against a pipe's interior walls as the device is pulled through the pipe. The slinger head assembly disclosed in the instant application is related in that an air motor is mounted on a forwardly extending shaft to rotate a slinger nozzle so that sealing composition is thrown by centrifugal force against the walls of the pipe. However, the nozzle in the present application is a hollow cylinder with perforated casing walls, the latter being relatively thin. Also, the compositions disclosed herein can be used in the practice and use of the devices of the copending application.

FIG. 3 is a side elevation in section showing the supply container;

FIG. 4 is an exploded view of the rear collar holding the supply container;

FIG. 5 is an exploded view of the forward receiver for the supply container.

Figure 1:
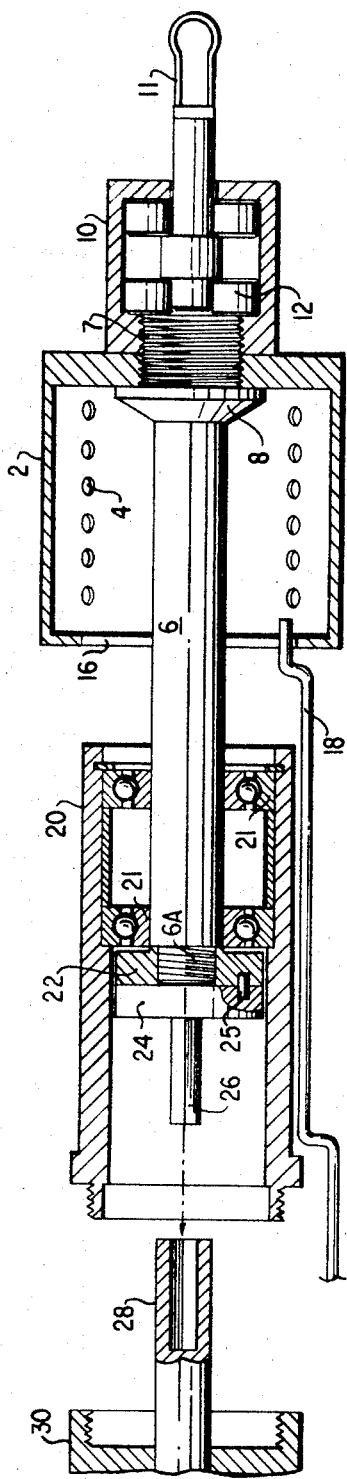
FIG. 1 is a side elevation in section of the nozzle and its bearing fittings.

In FIG. 1, the slinger head 2 is a cylindrical metal housing with a plurality of holes 4 in the sidewalls thereof. One end of the head 2 is screwed on the rotary shaft 6 on enlarged threaded end 7 and locked on with nut 8. A swivel connector 10 with coupling link 11 mounted on thrust bearings 12 is screwed on threaded end 7 so that the entire unit can be pulled through a pipe by hitching a cable to the link 11 at the front of the assembly. Preferably, the link 11 is coupled to one end of a TV camera and the camera has a towing cable connected at its opposite end.

An opening 16 is provided at the front end of head 2 so that shaft 6 can be passed through and a feeder pipe 18 also entered to discharge sealing composition within the head. The pipe 18 leads back to a pressured container 50 which normally trails the entire assembly.

The shaft 6 is passed through bearing housing 20 and mounted on thrust bearings 21. Shaft 6 terminates in a necked-down threaded portion 6A to which disc 22 is secured and a pin clutch 24 is affixed to drive disc 22 through pin 25 in the latter disc which fits within a recess in disc 24. Thus disc 24 can be easily disengaged from disc 22 by simply sliding disc 24 away from disc 22. A stub shaft 26 on disc 24 constitutes a drive adapter which can be fitted to the drive shaft 28 of an air motor 30. Thus, the slinger head 2 can be placed in direct drive with the air motor 30 for high speed rotation. The forward portion of housing 20 remains spaced from the slinger head 2 so that feeder pipe 18 can protrude in the opening 16 as shown in FIG. 1 to dispense grout, epoxy or other sealant.

On a 8 inch gas pipe, coatings of the below composition of up to about one-eighth inch thick can be made at the rate of 18 inches of lineal movement for each 1-4 minutes depending on the viscosity of the composition. The slinger head for such an application can be about 2 inches diameter fitted on a one-half inch shaft with about 20 holes, each hole being about three-sixteenths inch diameter.

Figure 2:
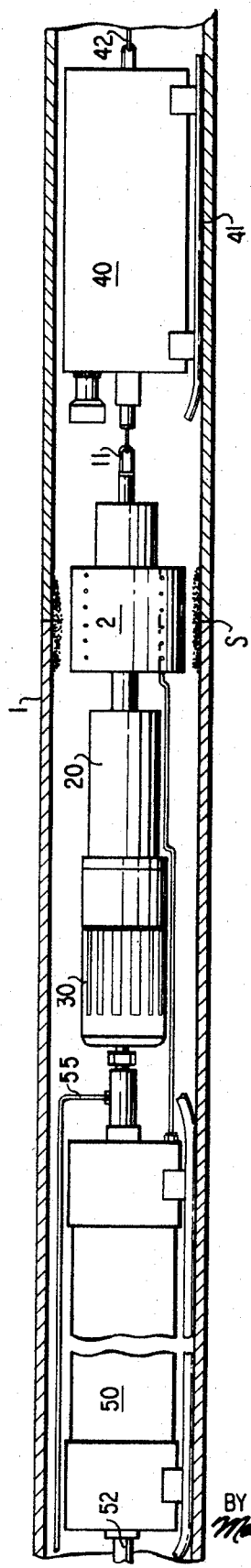
FIG. 2 is a side elevation in section of the entire assembly as it is moved through an underground pipeline to seal the joints and/or faults in the pipe.

In FIG. 2, a TV camera 40 has its lens directed towards the nozzle 2 and the light source, incandescent, flourescent or fiber optics, with electrical fittings and wiring have been eliminated for the sake of brevity. A tow cable 42 is connected to the camera at one end of the assembly to pull same through pipeline 1. The supply container 50 and the camera 40 have skids or runners 51 and 41 respectively. The supply container 50 also has a cable and air hose 52 connected to its back end for towing together with power supply connections.

A movable piston is slideably mounted within cylinder 50 to be urged towards the air motor under air pressure supplied through hose 52 and a second air pressure hose 55 is connected to the air motor 30. The controls for supplying air through each hose are manipulated by an operator above ground, usually in a truck near the screen for the TV camera 40. The nozzle 2 is positioned adjacent a pipe seam S and held in that position while being rotated to discharge a desired amount of sealant to bracket the leak site. In practice, a cast iron gas pipe, in which gas is subject up to several pounds pressure, can be repaired by coating each pipe joint or seam while inspecting the pipe line during the recoating. Thus, the TV camera functions to permit accurate placement of the nozzle opposite each seam during recoating while serving as an inspection device as it is moved progressively through the pipeline.

In FIG. 3, the container 50 is shown with its quick release tube 101, which is removable and disposable, fitted between a forward receiver 103 and a rear collar 105 and sealant tube 101 retainer 100. The forward receiver 103, skids 51, and the rear collar 105, form a permanent frame whose length is determined by the length of skids 51 attached to forward receiver 103 by fasteners 53 and to rear collar 105 by fasteners 54. The rear collar 105 has a bayonet slot 108 to receive a pin 107 on the rear retainer 100 which has an air hose 52 fitted to the bore 107. O ring 104 slotted into forward receiver 103 seals the front of quick release tube 101 and O ring 106 slotted into rear retainer 100 seals the rear of quick release tube 101 when assembled. Pressured air passes through bore 107 and forces piston 110 forwardly towards receiver 103 to force the sealant out of chamber 111 through passage 113 and then tube 18. Shaft 102 can be a machined part of receiver 103 but here is a separate part affixed to the front of receiver 103 for attachment to the air motor. Two bayonet studs 118 fit into slots 119 and a seal ring 119 is provided to prevent leakage. Thus, it will be appreciated that shaft 102 can be bored to supply material to the slinger head, if desired.

It will be appreciated that loads of sealing composition can be mixed in tube 101 in varying amounts and after use, the tube 101 can be thrown away and the forward receiver 103 quickly cleaned. Also, containers of varying lengths can be used simply by loosening and moving the collar 105 and receiver 103 relative to skids 51 with fasteners 53 and 54.

The use of a closed circuit TV and a cureable sealing composition to repair underground gas pipelines, especially those of less than 16 inches diameter has heretofore not been practiced. As disclosed herein, it is now possible to repair gas pipelines of small diameter, even those of 6 inches diameter, by moving the entire assembly through the pipeline and viewing the slinger head through a TV camera while a cureable composition is thrown by centrifugal force against the sites of leaks, joints or the entire inner surface of the pipeline. While grout can be used in water and/or sewer lines, the use of any epoxy composition is particularly successful in treating as pipelines of small diameters. With the arrangement shown in FIG. 2, inspection and excellent control of the pipeline being treated is realized.

The preferred coating composition comprises a low molecular weight epoxy resin with a flexing agent in the weight ratio of resin to agent of about 70:30. A curing agent is used in varying amounts depending on the operating temperature and the length of pot life desired. For the composition disclosed herein, the curing agent can be varied between about 1.4 – 6 percent by weight of the resin.

The lower the temperature and the less curing agent used, the longer the pot life. As relatively high temperatures, i.e., above 70° F., less curing agent is used and when the operating temperature is about 90° – 95° F. or higher, an inhibitor can be mixed in the composition of lower temperatures, the inhibitor greatly increases pot life. In general, the amount of inhibitor should be about 2 – 10 percent by weight of the curing agent. Fatty acids, such as stearic or oleic acid as well as dibasic acids, including oxalic acid, are suitable. Phthalic anhydride is also operative as an accelerator within the above ranges, namely about 2 – 10 percent of the accelerator agent and can be used when temperatures are below 65° F. or at higher temperatures if desired to affix a time delay in the pot life/gellation and cure cycle of the resin.

A finely divided asbestos filler can also be used to control the viscosity of the sealing composition and the amount of such an inert filler used can vary widely, but generally will comprise about 5 – 15 percent by weight of the total composition. The preferred sealing composition used to coat a cast iron horizontal pipeline, using a nozzle such as that shown in FIG. 1 which is rotated at 500 – 20,000 RPM, preferably 10,000 – 15,000 RPM, is as follows:

| | % by weight |
|---|---|
| 1. Epoxide resin, low molecular wt. Epoxide equivalent No. 170–220, A type. Epon 800 series, Shell Chem. Co. (epichlorohydrin-bisphenol or polyglycidal ether type) | 55–70 |
| 2. Flexing agent, Polysulfide Rubbers (Thiokols) urethane, other cureable resilient materials. | 20–30 |
| 3. Inert filler, such as finely divided or fibrous asbestos, diamataceous earth, silica. | 7–15 |
| 4. Curing agent, polyamines such as methane diamine, benzyl dimethyl amine, (BDMA Sherwin Williams) dimethylaminomethyl phenols* (Rohm & Haas – DMP–10 and 30) Also, polyamides derived from dimerized fatty acids and an aliphatic polyamine. (Epon V25 Shell Chem. Co.) | 1.5–6 |
| 5. Inhibitor, Fatty acids; saturated and unsaturated, having 6–18 C atoms); hydroxy and dibasic (2–10 C atoms) organic carboxylic acids such as oxalic, salicylic. | 0–0.5 |
| 6. Accelerator phthallic anhydride | 0–0.5 |

* the phenols should not be used with a fatty acid inhibitor.

Other additives such as carbon black and sulfur can be added to the rubber. Also, thermosetting, phenol-formaldehyde liquid resins of the one-step type or polyurethane resins can be used instead of the epoxy-curing agent combination.

The following composition was applied with good results at about 85° F. temperature in an underground 8 inch gas pipeline. The composition has a pot life of about 4 hours and solidifies to a gel in about 12 hours with a complete cure in about 4 days. After initial gel, the pipeline was tested with up to 5 psi. Up to 30 pounds or more could be applied to the pipeline once complete cure had taken place (Tests were applied at 15 psi).

| | % by weight |
|---|---|
| Shell "Epon" Resin 828 (A type) Epichlorohydrin-Biphenol Epoxide No. 180–188 | 62 |
| Flexing agent — Thiokol LP-32 Polysulfide rubber | 26 |
| Asbestos (fibrous) | 9.8 |
| Curing agent Sherwin Williams BDMA (Benzyl Dimethyl amine) | 2 |
| Oleic acid | 0.2 |

The resin and flexing agent are mixed by folding and/or milling until blended, then the asbestos is slowly added, avoiding agglomoration or flocculation, until homogeneous. This mixture is then packaged for the field to comprise a load for a supply cylinder of quick release tube which is attached to the nozzle to be moved through a pipeline. Usually, 25 – 50 lbs. is mixed and used as needed in 3 – 5 pound increments.

Immediately before the supply tube 101 is attached to the assembly and placed in the pipeline, the curing agent accelerator and/or inhibitor are mixed in the load.

When used with a fatty or dibasic acid inhibitor, the phthalic anhydride accelerator causes the sealing composition to quickly gel after an initial delay of, say 1 – 2 hours. The phthalic anhydride operates to cure the epoxy resin but not the polysulfide flexing agent. When using a carbon black/sulfur filler, curing activity is also extended to the polysulfide flexing agent.

The normal load can be used to coat bands of about 1 – 2 inches wide to bridge the connecting seams between 12 or 16 feet lengths of pipe or to completely coat the interior surfaces of pipe. Thus, about 400 feet of pipe can be coated with bands of composition about one-eighth inch thick. In other words, about 50 grams of composition per seam can be used with the bands averaging about 1.5 inches wide in an 8 inch diameter pipeline.

The above epoxy resin is of the low mole molecular weight type and have an epoxide equivalent No. 180–188. With 1,800 grams of the above sealing composition the following relationships of pot life and cure time are applicable:

| Temperature | Catalyst (Gms) | Pot-Life | Gellation | full cure |
|---|---|---|---|---|
| 72°F. | 49 gms. | 2.7 – 3.2 Hrs. | 12 Hrs. | 3.2 days |
| 76° | 47 gms. | " | 15 " | 3.9 " |
| 80° | 44.5 gms. | " | 18 " | 4.8 " |
| 84° | 41.5 gms. | " | 22 " | 5.8 " |
| 88° | 38.5 gms. | " | 27 " | 7.0 " |
| 92° | 37.0 gms. | " | 33 " | 9.2 " |
| 96°* | 35.5 gms. | " | 40 " | 12.0 " |

* Add .1% Oleic Acid before adding catalyst — .2 percent from 98°F. up. 38 grams of curing agent (catalyst) will affect a full cure at any temperature range and is a safe addition in the field per 1800 gram charge of compound.

In general, with each 2° rise in temperature between 70° – 78° F., a gram of catalyst can be omitted from a load of about 1,800 grams to insure the same pot life and cure time. Above 80° F., 1.5 grams of catalyst can be omitted from each 2° rise in temperature. Above 90° – 95° F., an inhibitor should be added, in the amount of 0.1 – 0.2 percent based on the weight of the curing agent for every 2° F. rise based on the amount of curing agent used at 70° F.

As disclosed herein, all parts and percentages are by weight unless indicated otherwise.

It is particularly important that the pot life of the composition be at least two hours and preferably more. It will be appreciated that in operation, the assembly is drawn through a pipe behind a TV camera which is faced towards the nozzle. As each seam or other potential leak site comes into view opposite the nozzle, the operator above ground turns on the air motor to spin the slinger nozzle and at the same time, air pressure is applied to a piston in the supply cylinder container 50 to force about 50 grams of the aforedescribed sealing composition inside the nozzle. Continuous operation of the assembly is carried out in coating operations when the entire inner surface of the pipeline is to be sealed. However, it is necessary to correctly position the nozzle and, in practice, considerable time is spent in accurately applying the cureable composition in the pipeline. Thus, it is an important feature of the present invention to provide a sealing composition with an inhibitor and/or accelerator to control the time within which a fully mixed composition can be applied, particularly at the variable temperatures encountered in the field.

What is claimed is:

1. A method of sealing an underground gas pipeline having a diameter up to about 16 inches comprising moving a sealing assembly, including a supply container connected to a rapidly rotating nozzle, through the pipeline and slinging a cureable sealing composition from said nozzle by rotating the nozzle at 500 – 20,000 RPM to induce centrifugal force and deposit a band of the composition on selected portions of the inner surfaces of the pipe, viewing the rotating nozzle through a TV camera positioned in front of said nozzle with respect to the direction of movement thereof and remotely controlling the movements and operation of the assembly from above the ground responsive to the slinging action of the nozzle, and thereafter removing the assembly from the pipeline and permitting the composition to cure.

2. The method of claim 1 wherein the nozzle is rotated at about 10,000 – 15,000 RPM to spread a coating about one-eighth inch thick.

3. The method of claim 1, wherein said composition is an epoxy composition which is first allowed to gel and subsequently cure in situ.

4. The method of claim 1, wherein said cureable composition is an epoxy resin having a curing agent packed in the supply container which is moved with the nozzle and TV camera as a unit through the pipeline.

5. The method of claim 4, wherein the pipeline is of cast iron.

* * * * *